No. 609,684. Patented Aug. 23, 1898.
H. I. LAHR.
MACHINE FOR MAKING CELL CASES.
(Application filed July 31, 1897.)

(No Model.) 8 Sheets—Sheet 1.

Witnesses:—

Inventor:
Harry I. Lahr.
By his Atty.

No. 609,684. Patented Aug. 23, 1898.
H. I. LAHR.
MACHINE FOR MAKING CELL CASES.
(Application filed July 31, 1897.)
(No Model.) 8 Sheets—Sheet 2.

Witnesses:-

Inventor:
Harry I. Lahr
By his Atty O. B. Reichelt

No. 609,684. Patented Aug. 23, 1898.
H. I. LAHR.
MACHINE FOR MAKING CELL CASES.
(Application filed July 31, 1897.)
(No Model.) 8 Sheets—Sheet 4.

Witnesses:—
W. H. Rowe
B. Krupp

Inventor:
Harry I. Lahr.
By his Atty. O. B. Reichelt

No. 609,684. Patented Aug. 23, 1898.
H. I. LAHR.
MACHINE FOR MAKING CELL CASES.
(Application filed July 31, 1897.)

(No Model.) 8 Sheets—Sheet 5.

Witnesses:-
O. H. Rowe
B. Murphy

Inventor
Harry I. Lahr.
By his Atty. O. B. Reichel.

No. 609,684. Patented Aug. 23, 1898.
H. I. LAHR.
MACHINE FOR MAKING CELL CASES.
(Application filed July 31, 1397.)

(No Model.) 8 Sheets—Sheet 7.

Witnesses:-
O. H. Rowe
B. Kumpa

Inventor
Harry I. Lahr:-
By his Atty. O. B. Reichelt.

THE NORRIS PETERS CO., PHOTO-LITHO., WASHINGTON, D. C.

UNITED STATES PATENT OFFICE.

HARRY I. LAHR, OF LAFAYETTE, INDIANA.

MACHINE FOR MAKING CELL-CASES.

SPECIFICATION forming part of Letters Patent No. 609,684, dated August 23, 1898.

Application filed July 31, 1897. Serial No. 646,600. (No model.)

*To all whom it may concern:*

Be it known that I, HARRY I. LAHR, a citizen of the United States, residing at Lafayette, in the county of Tippecanoe and State of Indiana, have invented certain new and useful Improvements in Machines for the Manufacture of Cell-Cases, of which the following is a specification.

My invention relates to the manufacture of cell-cases used for the packing and transportation of eggs, fruit, and other articles manufactured from strawboard or other suitable material formed into strips, assembled in sets, and interlocked by means of partial cross-cuts in the strips, forming compartments to receive the eggs and other articles singly.

The object of my invention is to provide an improved machine for the manufacture of cell-cases from a roll or rolls of suitable material which will admit a continuous movement of the material from the moment the strips are delivered from the cutting-rolls until the cell-cases are finished and delivered from the machine.

A further object of my invention is to construct a machine for the purpose specified which may be run at a high rate of speed, will be simple, strong, and not subject to derangement or breakage of parts, and which will operate in an effective manner to securely interlock the strips without breaking or damaging them in any way.

My invention consists generally in a machine provided with means for punching the material drawn from the rolls to form suitable interlocking slots and incisions, for cutting the strips therefrom transversely in sets, for carrying said strip sets from opposite sides of the machine, for delivering each set to corresponding continuously-moving carriers which bring the interlocking strip sets together, and for delivering them from the machine in an uninterrupted and rapid manner.

My invention further consists in an improved machine for making cell-case strips in sets cut transversely from rolls of material and for cutting alternate sheets from said material to form partition-boards which are conducted away from the machine, while the sets of cell-case strips are brought together from opposite sides of the machine and interlocked in a continuous manner.

My invention further consists in a machine embodying certain constructions and combinations of parts which will admit of the complete and effective execution of the operations referred to and hereinafter particularly described.

In the accompanying drawings.

A suitable frame 1, consisting of oppositely-disposed side sections $1^a$ at either end, supports the cutting and transmission feed mechanism, and similar intermediate sections $1^b$ provide suitable housings for the carriers and mechanism for interlocking the cell-case strips.

An upper punching-cylinder 2 and a lower die-cylinder 3 are each provided, respectively, with sets of punches and dies arranged thereon with intermediate blank sections, and similar rollers 4 and 5 are provided, having knives arranged lengthwise of the rollers to cut the material fed in a continuous sheet thereto into sets of transverse strips 6, each set to form one of the interlocking sections of a cell-case, the said continuous sheet being also separated into blanks or rectangular sheets 7 between each set of cell-strips, thus providing intervals during the continuous transmission of the material for the sets to be placed in separate, successive, and continuously-moving carriers 8, which carry and interlock the cell sets of strips 6 together.

Figure 11:
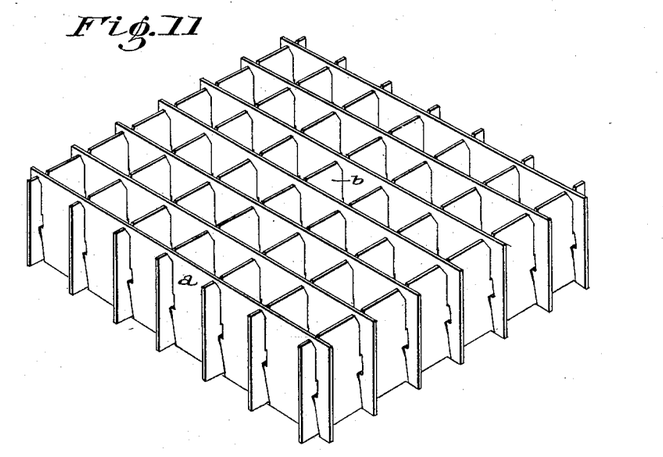
Fig. 11, a perspective view of an ordinary cell-case complete.
Figure 14:
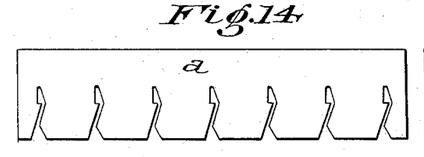
Figs. 14 and 15 are enlarged side elevations, respectively, of the male and female cell-case strips.
Figure 15:
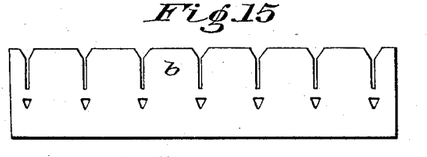

The strips 6, which form the cell-cases, are made with the usual slots and notches and are preferably formed as shown in Figs. 14 and 15, the male strips $a$ engaging with the female strips $b$, and when locked together form the rectangular system of cross-strips shown in Fig. 11.

A chute-plate 9 is secured transversely and connected at its ends to the side plate $1^a$ of the frame in close proximity to the delivery contact-surface of the knife-rollers 4 and 5 and inclined downwardly toward the middle of the machine to tape-rollers 10, also supported transversely to the machine by means of journal-bearings in the side frames, the tapes being directed in any suitable direction to carry off the material, such as blank partition-boards, which are separated from the endless sheet between each set of strips. This is accomplished by means of a switch 11, consisting of a set of fingers $11^a$, secured to a rock-shaft $11^b$, having a crank-arm $11^c$, which engages, by means of a roller $11^d$, upon the end thereof with a cam-groove $5^a$ in the face of the lower knife-roller 5. When the switch-fingers are in their horizontal position, the set of strips will be carried freely over them to the initial feed-rollers $12^a$ $12^b$ and delivered to the separating feed-rollers, which carry the receiving ends of transmission-tapes 14, the latter serving to conduct the strips from the initial feed-rollers to the carriers.

Figure 16:
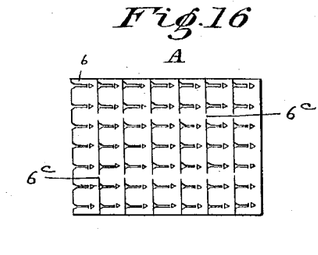
Fig. 16, a diagram of a set of punched cell-strips before they are separated.
Figure 17:
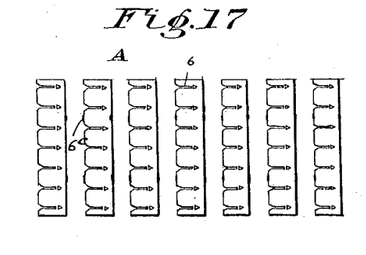
Fig. 17, a similar view of said strips after they have been separated and delivered to the transmission-tapes.
Figure 18:
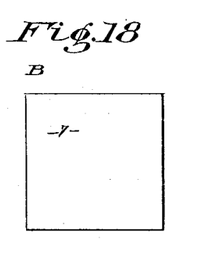
Fig. 18, a plan of the blank sheet or cell-partition.

The strip sets A are completely severed from the partition-boards B by knives $5^b$, which extend completely across the material, while the knives $5^c$, which separate the several strips 6 in the set from each other, have small notches cut from the said knives to leave the strips but partly separated from each other, the short uncut portions $6^c$ left by the notches of the knives serving to hold the strips intact or together in sets sufficient to make one section of the cell-case. The strip sets are thus carried smoothly and with great precision to the initial feed-rollers $12^a$ $12^b$ and are delivered by them to the separating feed-rollers $13^a$ $13^b$ in unsevered sheets, as shown in Fig. 16, the said feed-rollers being geared as hereinafter described and caused to travel at a surface speed greater than that of the initial feed-rollers, thereby causing each strip to be successively severed from the next following strip, as shown in Fig. 17, and passed forward a suitable distance to separate the said strip and successive strips from one another to thus deliver the strips in parallel lines at short intervals, one following the other, between the tapes and in suitable order to be easily transferred to the carriers, which are moved across their path at the delivery ends of the tapes. The material between each set of sheets or strip-sheet is cut completely across to provide intermediate rectangular sheets, which may be used for partition-boards B, as shown in Fig. 18, thus utilizing the material completely and providing a space interval between each set of strips.

The feed-rollers $12^a$ $12^b$ are geared together by gear-pinions $12^\times$ $12^{\times\times}$ and are connected by an intermediate gear 32 with a spur-gear 34 on the roller-shaft $4^a$, and spur-gear 33, of larger diameter, also carried by said shaft $4^a$, is connected by an intermediate gear 31 with the upper one of the gear-pinions $13^\times$ upon the shaft $13^a$ of the transmission-tapes, a similar gear-pinion $13^{\times\times}$ engaging with the pinion $13^\times$ of shaft $13^b$ of the lower transmission-tapes, thus driving the said transmission-tapes at a greater speed than that of the feed-rollers and providing means for separating the strips, as hereinbefore described.

Figures 9, 10:
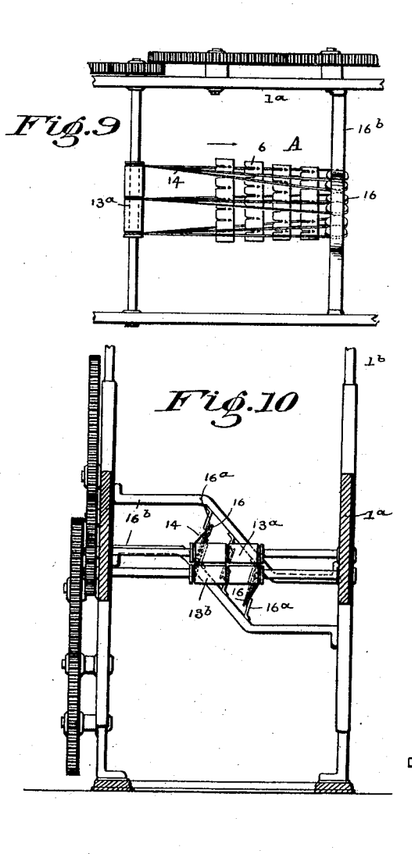
Fig. 9, a plan of parts of the frame, showing the tape transmission mechanism.
Fig. 10, a transverse section of like parts of the frame, showing an end elevation of the tape-transmission mechanism.

The tapes 14 are supported at their receiving ends in circumferential grooves in said separating feed-rollers $13^a$ $13^b$ and are then conducted to and around tape-pulleys 16, which are supported upon the journals of brackets 16ª, carried by transverse zigzag frame-bars 16ᵇ, bolted at their ends to the side frames of the machine. The tapes are thus arranged to receive the strips from the horizontal separating-rollers and deliver them at an angle thereto, as clearly shown in Figs. 9 and 10, and thus adapt them to be placed between the inclined grip-plates $8^a$ $8^b$ of the carriers 8. The angular delivery of the strips to the carriers is required because of the diamond-shaped outline of the carriers, this shape being the result of interlocking the strips at an angle other than a right angle, which position renders the strips less liable to mutilation while being interlocked.

The carriers are pivotally supported upon shafts 17, carried horizontally by lug projections $18^a$ upon the inner sides of endless link belts 18, which pass over link-belt-carrying wheels 19 upon horizontal shafts 20, supported in bearings $20^a$ $20^b$, affixed to the intermediate sections $1^b$ of the frame. The upper bearings $20^b$ are made adjustable in slotted openings $1^d$ of the intermediate section of the frame, by which means the chains may always be kept at proper tension.

The shaft 17 of the carriers is journaled in the lug projections $18^a$ of the link belts and are conducted upwardly upon the outer side and downwardly upon the inner side of the frames to approach each other upon the said inner sides of the frames, and the shaft 17 and link belts 18 are prevented from swaying or moving out of a fixed path by means of friction-rollers $17^a$ upon the shafts, near the ends thereof, which are held upon guide-plates 21, secured by posts $21^a$ to the side pieces of the intermediate sections $1^b$ of the frame. The guide-plates 21 upon the inner oppositely-disposed sides are inclined both from above and below at $21^c$ $21^d$ to meet a straight vertically-arranged section $21^b$ thereof, which thus causes the carriers to move toward each other from opposite sides when the cell sets are to be brought together, as will hereinafter appear.

The carriers 8 are supported to move in vertical planes both in their upward and downward courses by means of short crank-arms 22, secured to the shaft 17 and provided with rollers $22^a$ upon their vibratory ends, which engage with and are held between guide-plates 23, arranged within and substantially parallel to the guide-plates 21. The guide-plates 21 hold the ends of the shaft 17 in their required paths, and guide-plates 23, secured to the side pieces of the intermediate frame $1^b$ by posts $23^a$, receive the rollers of the crank-arms 22, and thus hold the carriers to move in parallel planes and in a fixed path at any required speed without causing undue vibration or harmful strain either upon the link belts or upon the gearing.

The carriers 8 have pivot-bolts $8^c$, which pass through the shaft 17 and are held thereon to turn freely therein by the hub $24^a$ of a crank-arm 24, which is fitted upon the reduced end of the said bolt $8^c$ and is secured thereon by a nut $8^d$, and the crank-arm 24 has a pin $24^b$, carrying a friction-roller $24^c$, which engages with guide-rails 25 and 26, supported upon the cross-bars $1^c$ of the frame to swing the carrier at its required angle upon the pivot-bolt. The carriers are secured at such angle to the crank-arms 24 that the grip-plates of the carriers will be held while the rollers of the said crank-arms pass over the vertically-disposed section of the guide-rail 25 in a suitable inclined position to receive the strips as they are delivered from the transmission-tapes, after which the carriers are moved upwardly and then turned upon their pivot-bolts, by means of the inclined rails 26, to a position at a reverse inclination to that occupied while receiving the strips, and thus held while they are passed downwardly upon the inner plane of movement, while the corresponding carriers are similarly conducted and held at an oppositely-inclined position.

Figure 12:
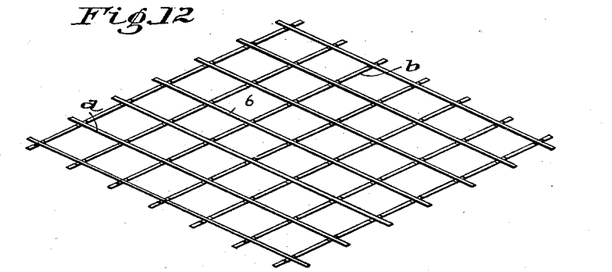
Fig. 12, a plan view of a cell-case with the strips held in the preferred position for interlocking them.

The grip-plates of the two interlocking carriers are preferably held at an angle substantially corresponding to that shown by the cell-case strips in Fig. 12 of the drawings, and when the strips are thus brought together at an angle they are much more readily interlocked one with the other, so that no abrupt contact of interlocking edges and surfaces is thus required.

Figure 6:
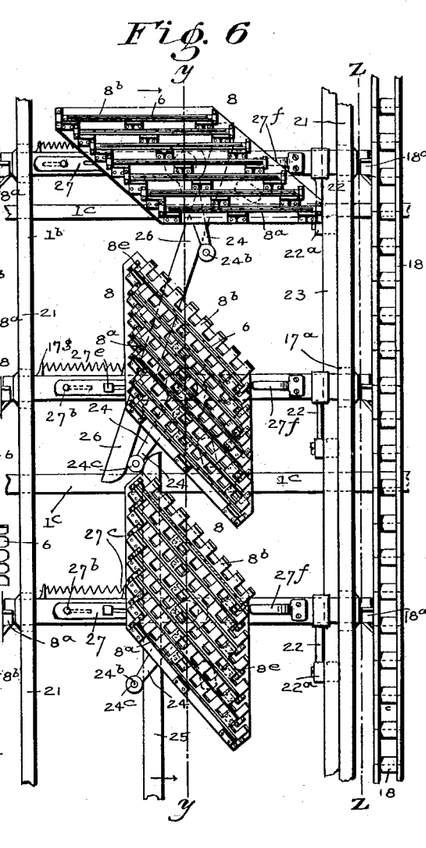
Fig. 6, an enlarged end elevation of part of the frame, showing three carriers, two of them open and in receiving position and one of them closed and partly turned.
Figure 7:
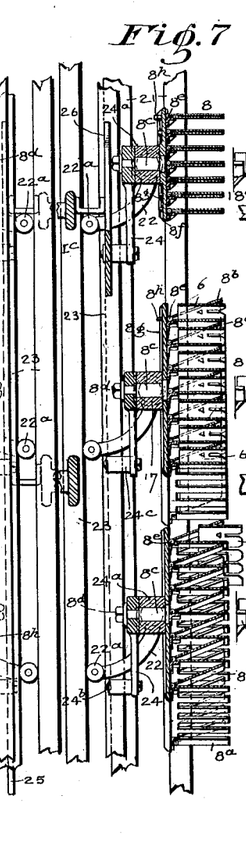
Fig. 7, a vertical section in line $y$ $y$ of Fig. 6.
Figure 8:
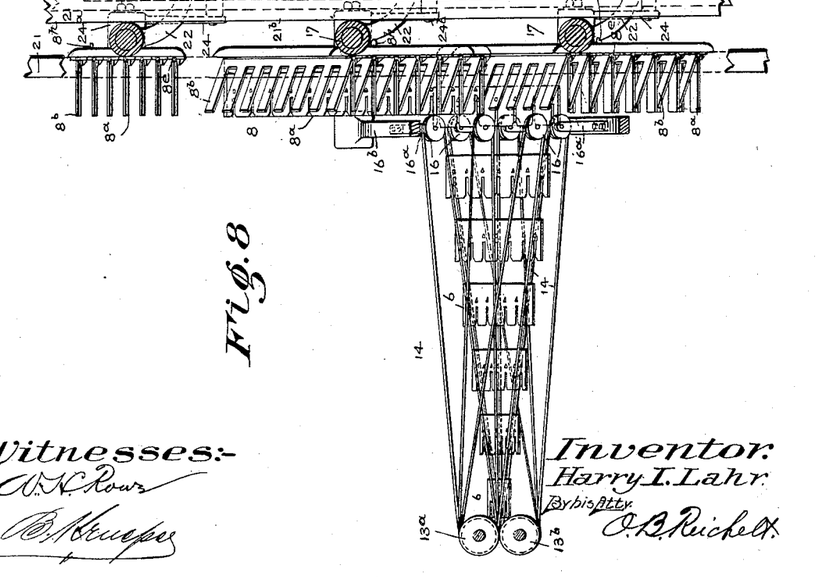
Fig. 8, a similar section in line $z$ $z$ of Fig. 6.
Figures 22, 23, 24, 25, 26, 28:
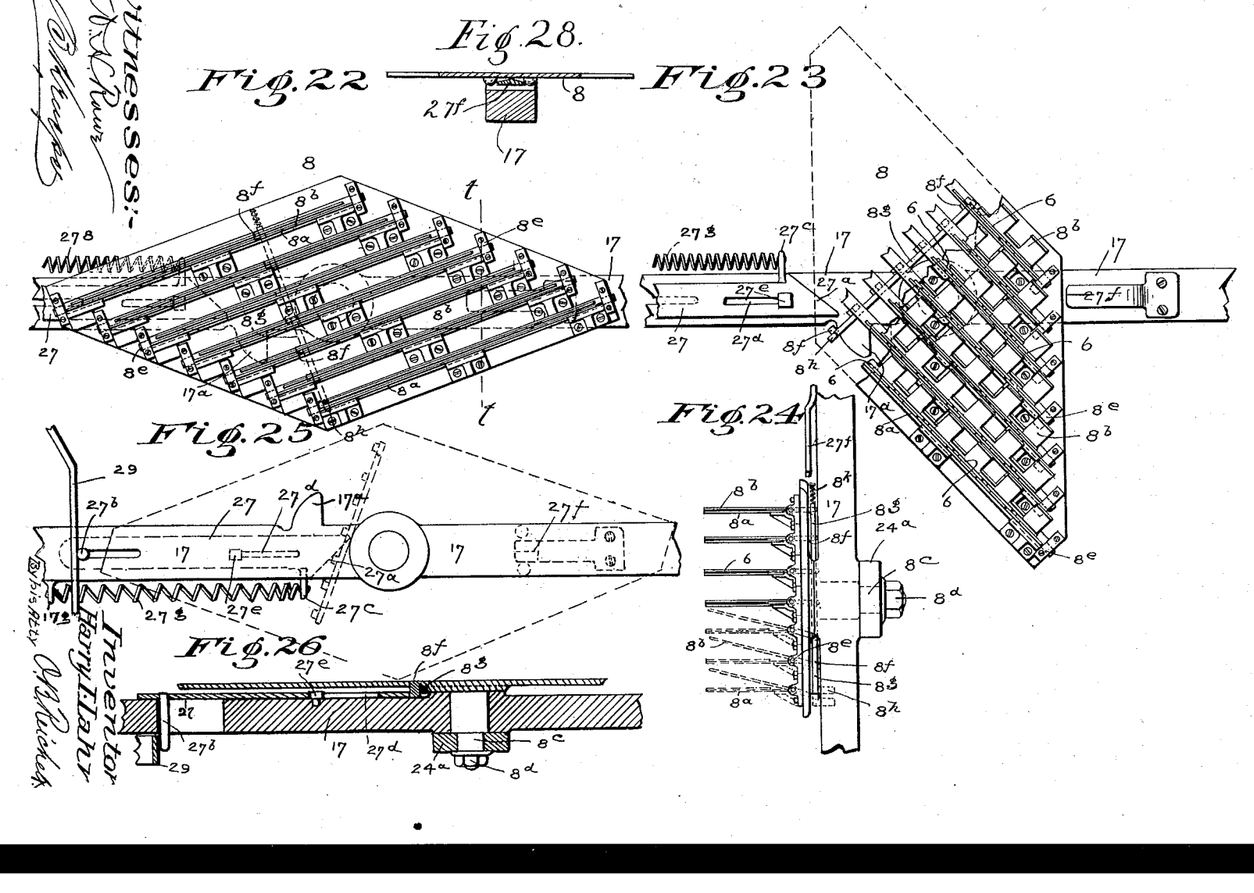
Fig. 22, an enlarged front elevation in detail of the face of one of the carriers in position to carry and interlock the strips with the shaft shown in dotted lines and the grip-plates closed.
Fig. 23, a similar view of one of the said carriers in position on its shaft to receive the strips with the grip-plates open, the carrier and grip-plates being partly shown by dotted lines.
Fig. 24, an enlarged end elevation of one of the carriers, with four of the grip-plates shown by full lines closed and with three of said grip-plates shown as open.
Fig. 25, an enlarged elevation of the carrier-shaft with certain parts of the carrier shown in dotted lines and with the sliding plate for opening the wedge-plates also shown by dotted lines.
Fig. 26, a longitudinal sectional elevation of a part of said shaft sliding-plate, and carrier base-plate.
Fig. 28, a sectional detail of one of the carriers and its shaft in line $t\,t$ of Fig. 22, showing the latch for holding the carrier longitudinally upon the shaft, as shown in Fig. 22, and crosswise of the shaft, as shown in Fig. 23.

The carriers are held truly in any one of their set angles or positions upon the shaft by means of spring catch-plates $27^f$, which hold the carriers securely either in their position to receive the strips by engaging with the marginal side of the said carriers opposite the ends of the grip-plates, as shown in Figs. 6 and 23, or in their position to interlock the strips, as shown in Fig. 22, by engaging with the lugs upon the under side of said carriers, the tension of the spring being sufficient to hold the carriers when the latter are not positively acted upon to change their position, the crank-arms and guide-rails having sufficient power to break the spring-catch when the position of the carriers is to be changed.

The grip-plates $8^a$ $8^b$ of the carriers 8 are suitably slotted to allow the strips of the two interlocking carriers to cross each other and also to provide open spaces through which the stripping-rods may pass to remove the cell-cases from the carriers, as will hereinafter appear. One of the grip-plates $8^a$ is rigidly fixed to the base of the carrier and the other grip-plate $8^b$ is hinged thereto by hinges $8^e$, and each hinged grip-plate is provided with a pin $8^f$, which projects through holes in the carrier-plate, and the said pins are pivotally connected at their ends to a bar $8^g$, which will thus swing across the back of the carrier. A projecting lug $8^h$ upon the said bar $8^g$ is caused to abut against a cam projection $17^a$ upon the shaft when the carriers are swung around with their grip-plates at an angle to the shaft, as shown by the two lower carriers in Fig. 6, and thus press upon the bar $8^g$ and hold all of the hinged grip-plates $8^a$ open to receive the strips from the transmission-tapes. When the said carriers are swung around to the angle shown by the upper carrier in Fig. 6, the bar $8^g$ will be out of contact with the cam-plate and the hinged plates will be closed against the fixed plates by means of a suitable spring $8^k$, connecting the base-plate with the said connecting-bar of the carrier.

Figures 4, 21:
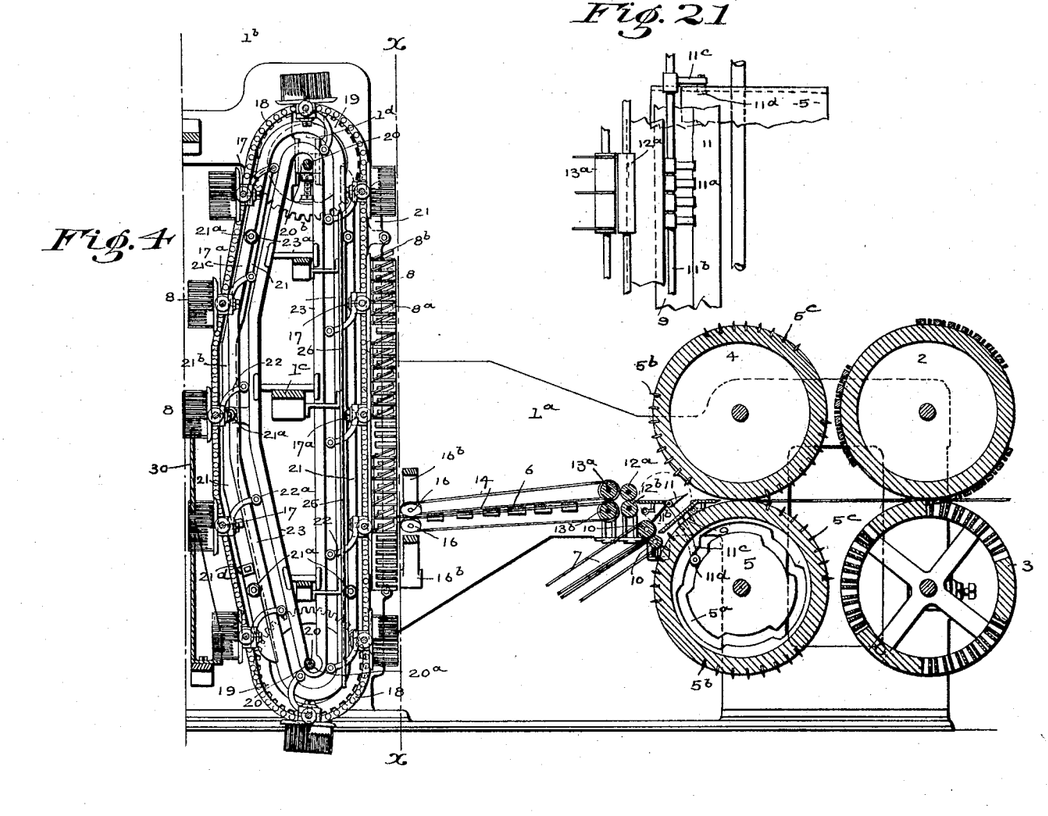
Fig. 4, an enlarged longitudinal section of the opposite end of the machine in the central line thereof.
Fig. 21, a detail showing the switch and adjacent mechanism.
Figures 5, 19, 20:
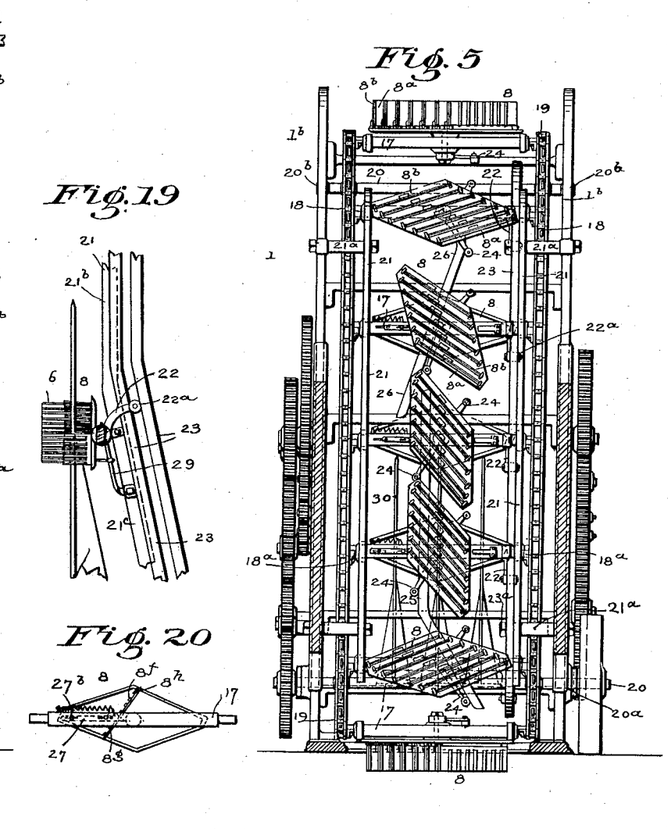
Fig. 5, a vertical sectional elevation of one end of the machine in line $x$ $x$ of Fig. 4.
Fig. 19, a vertical section through the shaft of one of the carriers, showing the inclined guide-rail and grip-operating rail with the cell-case partly removed from the carrier.
Fig. 20, an elevation in detail of the back of one of the carriers and carrier-shaft, showing the means for releasing the grippers when the cell-cases are removed from the carrier.
Figure 13:
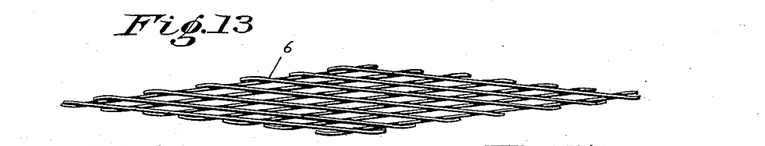
Fig. 13, an enlarged plan of the cell-case in the position in which it comes from the machine.

The two ends of the machine are alike in every respect, except that they are arranged oppositely to each other and the male strips are carried upon one end, while the female strips are carried upon the opposite end. When the carriers pass downwardly toward each other over the inwardly-inclined guideway-sections $21^c$, the two sets of cell-strips are brought together by the carriers, while both are in continuous downward motion to come together and interlock one with the other in continuously-approaching parallel planes until the two sections are securely locked together, this action being insured while the carriers pass closely locked together down the vertical intermediate sections $21^b$ of the guide-plate. While the said sections are passing over the lower and outwardly-inclined sections $21^d$ of the guide-plates, the carriers recede from each other, and the cell-cases are disengaged therefrom by means of stripper-rods 30, fixed by plates to the cross-bars of the frame, the slots of the carrier grip-plates receiving said stripper-rods, as shown in Figs. 4 and 5 of the drawings, when the carriers are moved downwardly past them. The cell-cases being thus stripped from the carriers are delivered by a chute or belt or any other suitable means for delivering them from the machine in substantially the closed or folded position shown by Fig. 13 of the drawings. When the cell-cases are to be moved from the carriers by the strippers, the hinged grip-plates are slightly opened to relieve the strips of pressure by means of a spur $27^a$ of a plate 27, fitted to slide upon shaft 17 to press upon one of the pins $8^f$ of the bar $8^g$ and hold all of the grip-plates $8^b$ open. The plate 27 has a pin $27^b$, which passes through a longitudinal slot in the shaft 17 and is pressed upon by a track-bar 29, bolted at its ends to the guide-plate 21 to press the plate 27 with its spur $27^a$ to push one of the pins $8^f$ of the connecting-bar, and thus open the grip-plates, the plate 27 being kept normally drawn toward the outer end of the shaft and away from contact with the pin $8^f$ by a coiled spring $27^g$, connecting a spur $27^c$ of the plate 27 with a pin $17^g$ upon the end of the shaft. A slot $27^d$ in the end of the plate 27 and a stud-bolt $27^e$, secured to the shaft 17, hold the plate upon the said shaft and allow it to slide thereon. When the pin $27^b$ has passed the track-bar 29, the spring $27^g$ will withdraw the spur $27^a$ from the pin $8^f$ of the bar $8^g$, and the spring $8^k$ will pull upon the said bar $8^g$ and close the grip-plates, the latter having been opened just sufficiently to relieve the strips of pressure while they are being disengaged from the carrier. The carriers, having delivered the cell-cases, will again be turned upon their pivot-bolts to the inclined position in which they are held when they receive the strips from the transmission-tapes.

Figure 1:
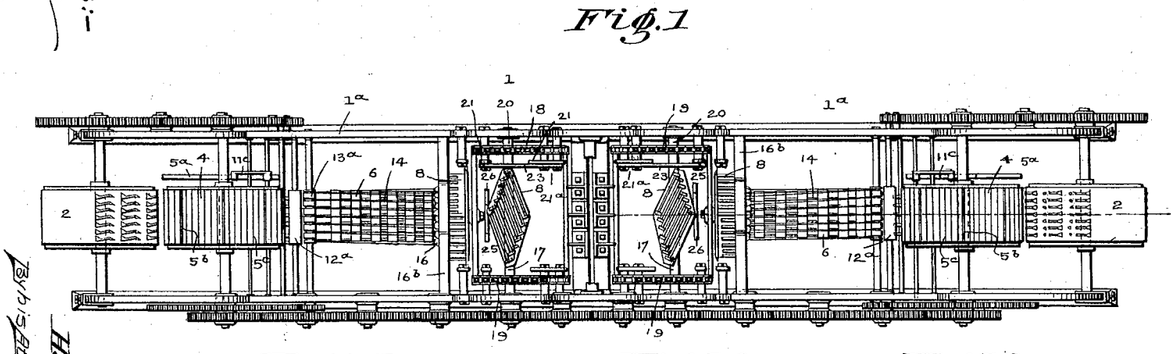
Figure 1 is a plan of my improved machine.
Figure 2:
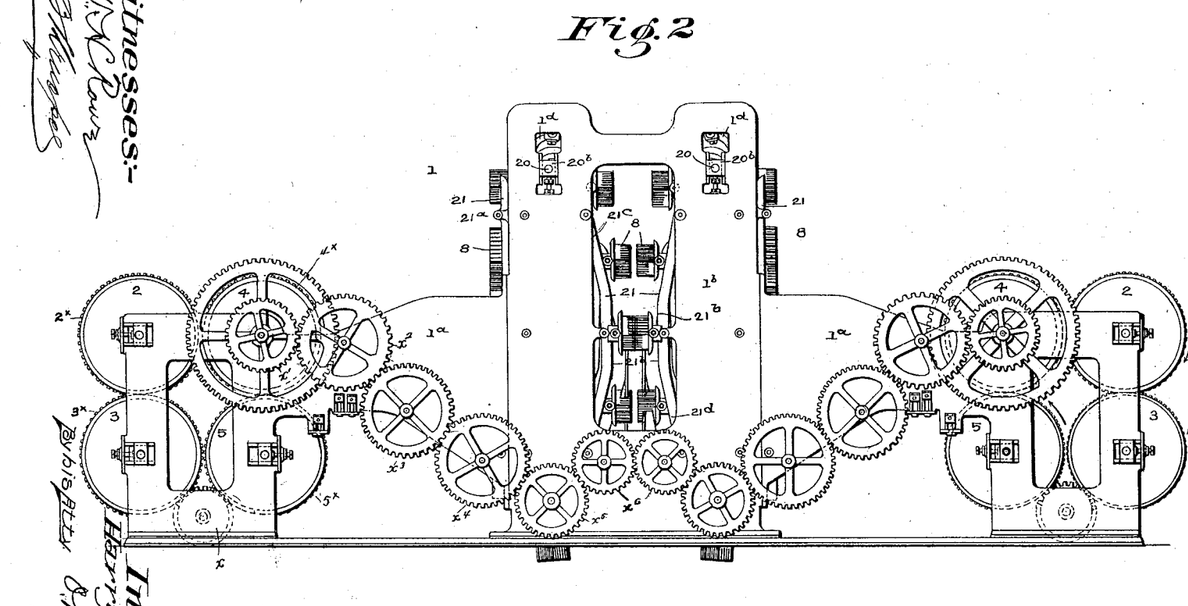
Fig. 2, a side elevation thereof.

The various shafts which carry the punching and cutting rollers at the end of the frame are geared together, as shown in Figs. 1 and 2 of the drawings, and the said shafts are also geared to the shafts which carry the chain-wheels at the base of the intermediate frame by intermediate transmission-gearing or in any suitable manner which will insure a proper surface speed to the various rollers, transmission and interlocking mechanism, as hereinbefore described.

By means of my improved machine I am enabled to deliver the material to the punching and cutting cylinders and from them, in a suitable manner, to rapidly and continuously moving carriers, which both receive and discharge the cell-cases therefrom without stopping at any part of the operation and enabling the machine to work at a very high rate of speed without injuring the cell-case strips in any way and producing cell-cases very rapidly.

Instead of forming the blank or partition board between each set of cell-strips the punching and cutting rollers at each end of the machine may be stopped at suitable intervals to allow the sets of cell-strips to be delivered to the initial feed-rollers and transmission-tapes at suitable intervals to deliver them to the carriers at corresponding intervals as the latter are presented one after the other to the delivery ends of said tapes.

It is evident that changes may be made in certain parts of the mechanism herein described without affecting the operation of other parts which are particularly specified in the claims. The transmission mechanism, for instance, may be used in connection with carriers which may be operated differently, and the carriers may receive the strips by other means than that herein shown, and the carriers may be brought together with their grip-plates square with each other without departing from or affecting other features of my invention, which are hereinafter claimed; but the machine is preferably constructed and operated in the manner shown to produce the best results with a high-speed machine.

The gearing for operating the several sets of mechanism hereinbefore described may be arranged in any preferred manner, the corresponding devices upon the opposite end of the machine being driven in like manner and the surface speed of all of the moving parts being the same except that of the transmission-tapes, which are driven at a higher rate of speed by means of intermediate gears, (shown in Fig. 3, partly by full and partly by dotted lines,) the rollers of the transmission-tapes thus being caused to travel more rapidly than the initial feed-rollers. The strips will be pulled apart and separated sufficiently to present them successively and at the proper time to the grip-plates of the carriers.

Figures 3, 27:
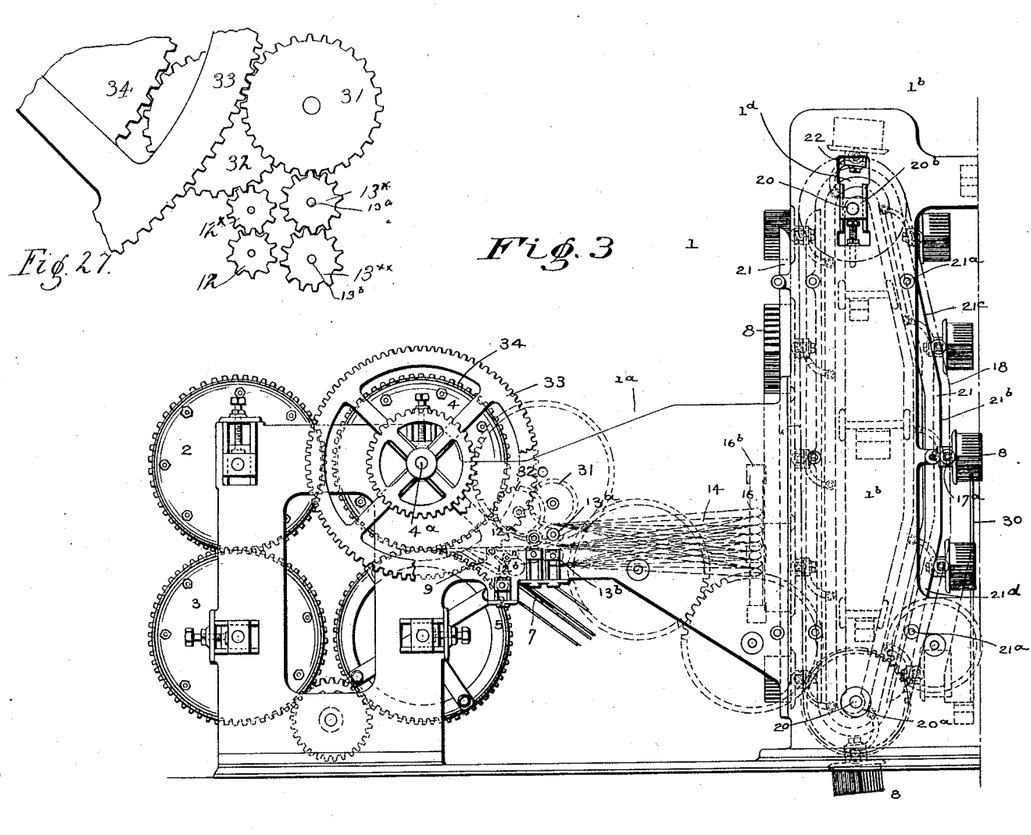
Fig. 3, an enlarged side elevation of one end of the machine, showing the principal parts covered by the frame in dotted lines.
Fig. 27, an enlarged detail of the gearing for operating the feed-roller and transmission-tape shafts.

The gearing shown in Figs. 2, 3, and 27 is alike at each side of the central line of the machine and consists of like spur-gears $2^{\times}$ $3^{\times}$ upon the shafts of the cylinders 2 and 3 and similar gears $4^{\times}$ $5^{\times}$ upon the shafts of the rollers 4 and 5, the gears $3^{\times}$ and $5^{\times}$ being connected by an intermediate gear-wheel $x$, suitably supported on the frame. The shaft of the roller 4 carries a gear $x'$, which is connected by intermediate gears $x^2$ $x^3$ $x^4$ with a gear $x^5$ upon the shaft 20 of the lower wheels 19 of the carrier link belts, thus serving to connect the latter with the rollers at the end of the machine. Two intermediate gears $x^6$ $x^6$ connect the shafts 20 20 of the carrier link belts, and thus connect the two corresponding trains of gear-wheels together, any suitable shaft of the system being driven in any usual or preferred manner.

What I claim as new, and desire to secure by Letters Patent, is—

1. In a machine for making cell-cases, the combination with cell-strip forming and transmitting mechanisms, of a double set of carriers supported upon endless chains and moved continuously to present the carriers first to receive the filler-strips and then to interlock said strips while moving continuously.

2. In a machine for making cell-cases, the combination with two sets of paper-carrying rolls and punching and cutting mechanism arranged respectively upon opposite ends of the machine to form sets of interlocking strips of transmitting mechanism for each of said sets of strips, oppositely-disposed carriers supported on link belts which are brought together to interlock the said strips and means for delivering the cell-cases from said carriers, substantially as described.

3. In a machine for making cell-cases, the combination with two paper-carrying rolls, punching and cutting mechanism arranged respectively upon opposite ends of the machine to form sets of interlocking strips and alternate partition-boards between said sets of transmitting mechanism for each of said sets of strips, oppositely-disposed carriers supported on link belts which are brought together to interlock the said strips and means for separating and delivering the partition-boards from the machine, substantially as described.

4. In a machine for making cell-cases, the combination with a set of horizontally-arranged rolls, and a set of strip-carriers, of a set of tapes and tape-carriers adapted to transmit said strips from a horizontal position at the rolls to an inclined position at the carriers, substantially as described.

5. In a machine for making cell-cases, the combination with a set of horizontally-arranged cell-strip-forming rolls, of a set of endless tapes and tape-carriers to transmit said cell-strips from a horizontal to an inclined position, and an endless chain having carriers pivotally supported thereon and adapted to be oscillated from an inclined position to receive said strips to a second position for delivering said strips, substantially as described.

6. In a machine for making cell-cases, the combination with a cell-strip forming and transmitting mechanism, of a double set of endless chains, cell-strip carriers pivotally supported thereon, guide-rails upon the frame, an intermediate mechanism adapted to oscillate said carriers from inclined positions to receive said strips to oppositely-inclined positions across each other to interlock said strips, substantially as described.

7. In a machine for making cell-cases, the combination with the frame, of a cell-strip forming and transmitting mechanism, a double set of endless chains carried thereon, each set having cell-strip carriers supported thereon, inclined guideways on the frame to engage with said endless chains and bring the carriers together from opposite sides of the frame, substantially as described.

8. In a machine for making cell-cases, the combination with the frame, of a cell-strip forming and transmitting mechanism, oppositely-disposed endless link belts, two sets of cell-strip carriers supported thereon and brought together to interlock the said strips while said carriers are moving in the same direction adjacent to each other, and fixed stripping-rods arranged in the path of movement of the carriers and adapted to remove the cell-cases from said carriers after the strips have been put together by the continuous progressive movement of the carriers and link belts, substantially as described.

9. In a machine for making cell-cases, the combination with the cell-strip forming and transmitting mechanism, of an upright frame, chain-carrying wheels supported upon transverse shafts to revolve therein, two pairs of endless chains carried by said wheels, shafts supported by said chain-carriers, crank-arms secured thereto, guides for holding the ends and directing the travel of said shafts and guides for receiving the ends of the crank-arms which control the oscillatory movement of the carriers, substantially as described.

10. In a machine for making cell-cases, the combination, the upright frame, the chain-carrying wheels, the endless chains, the shafts and carriers pivoted thereto, the arms secured to the carriers, the guide-rails for shifting said carriers from one angle to another upon the shaft, and spring-catches to connect the carriers with the said shaft when not acted upon by the arms and guide-rails, substantially as described.

11. In a machine for making cell-cases, the combination with the frame, of the endless chains, the shafts, the carriers pivoted thereto having a set of fixed clamping-plates and a corresponding set of hinged clamping-plates, pins projecting from the hinged plates, a bar pivotally connected to each of said pins, crank-arms on the carriers and guide-rails for oscillating the same and a stop on the carrier-shaft for operating said bar and hinged plates, substantially as described.

12. In a machine for making cell-cases, the combination with the cell-strip-forming mechanism, feed-rolls to deliver said strips therefrom, a system of carriers for conveying, arranging and interlocking the male and female strips of the cell-cases and a transmission mechanism interposed between the feed-rollers and the said carriers comprising initial feed and tape carrying rolls, a set of tape-pulleys arranged at an angle to that of the said feed and tape carrying rolls and the tapes connecting said rolls and pulleys, substantially as described.

13. In a machine for making cell-cases, the combination with the rotary punching-rolls, the rotary cutting-rolls for partly cutting the strips transversely from the sheet, feed-delivery rolls, strip carrying and assembling mechanism, transmission-tapes and rollers carrying the receiving ends of the transmission-tapes arranged parallel to the feed-delivery rolls, and geared at a higher surface speed to separate the strips with suitable intervals for delivering them to the strip-carriers.

14. In a machine for making cell-cases, the combination with the rotary punching-rolls, the rotary rolls for cutting the strip sets and alternate partition-boards transversely from the sheet, strip-transmission mechanism and partition-board-delivery mechanism and a switch located between the rolls and between the said transmission and delivery mechanism to divide the strip sets from the partition-boards, substantially as described.

15. In a machine for making cell-cases, the combination with the frame, of the endless link belts, the shafts, the carriers having a set of fixed clamping-plates, and a corresponding set of hinged clamping-plates, pins projecting from the hinged plates, a bar pivotally connected to each of said pins, a sliding plate fitted upon each of said shafts, and means for pressing said plate against the bar to release the clamping-plates, substantially as described.

In testimony that I claim the foregoing as my invention I have signed my name in the presence of two subscribing witnesses.

HARRY I. LAHR.

Witnesses:
B. KRUEPER,
C. H. SCHAFER.